United States Patent
Becker et al.

(10) Patent No.: US 6,855,739 B2
(45) Date of Patent: Feb. 15, 2005

(54) MODIFIED POLYURETHANE FOAMED MATERIALS USED AS ADSORBENTS

(75) Inventors: Armin Becker, Grossniedesheim (DE); Bernd Bruchmann, Freinsheim (DE); Andreas Arlt, Drebber (DE); Ulrich Treuling, Bensheim (DE); Rainer Rahm, Ludwigshafen (DE); Jürgen Decker, Speyer (DE); Ulrich Steuerle, Heidelberg (DE); Martin Kreyenschmidt, Lohne (DE); Willi Riegel, Waghaeusel (DE); Werner Bertleff, Viernheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 116 days.

(21) Appl. No.: 10/168,864

(22) PCT Filed: Jan. 25, 2001

(86) PCT No.: PCT/EP01/00791

§ 371 (c)(1),
(2), (4) Date: Oct. 28, 2002

(87) PCT Pub. No.: WO01/55242

PCT Pub. Date: Aug. 2, 2001

(65) Prior Publication Data

US 2003/0158279 A1 Aug. 21, 2003

(30) Foreign Application Priority Data

Jan. 26, 2000 (DE) .......................................... 100 03 156
Oct. 12, 2000 (DE) .......................................... 100 50 418

(51) Int. Cl.$^7$ .................................................. C08J 9/36
(52) U.S. Cl. .......................... 521/92; 521/94; 521/123; 521/128; 521/163; 521/170; 525/452
(58) Field of Search ................................ 521/128, 163, 521/170, 92, 94, 123, 174; 525/452

(56) References Cited

U.S. PATENT DOCUMENTS 5,847,014 A * 12/1998 Nodelman et al. .......... 521/110

FOREIGN PATENT DOCUMENTS

| JP | 03 009950 | 1/1991 |
| WO | 94 00237 | 1/1994 |

* cited by examiner

Primary Examiner—John M. Cooney, Jr.
(74) Attorney, Agent, or Firm—Oblon, Spivak, McClelland, Maier & Neustadt, P.C.

(57) ABSTRACT

The invention relates to polyurethane foams comprising
(i) ethylenimine, polyethylenimine, polyvinylamine, polyvinylamine copolymers, carboxymethylated polyethylenimines, phosphonomethylated polyethylenimines, quarternized polyethylenimines and/or dithiocarbamatized polyethylenimines or
(ii) alkali hydroxides and/or alkaline earth metal hydroxides or
a mixture consisting of both (i) and (ii).

7 Claims, 6 Drawing Sheets

Decrease in the acetic acid concentration (HAc) as a function of the contact time for various foams (■ = Basotect, ♦ = open-celled polystyrene foam, ▲ = polyurethane foam)

Decrease in the acetic acid concentration (HAc) as a function of the contact time for various foams (♦ = polyurethane foam as described in example 1, ▲ = polyurethane foam as described in example 2, ■ = polyurethane foam as claimed in example 3)

Decrease in the acetic acid concentration (HAc) as a function of the contact time for an unmodified polyurethane foam and a foam modified as described in example 4 (■ = modified polyurethane foam, ♦ = unmodified polyurethane foam)

Decrease in the acetic acid concentration (HAc) as a function of the contact time for an unmodified polyurethane foam and a foam modified as described in example 4 (■ = modified polyurethane foam, ♦ = unmodified polyurethane foam)

Decrease in the acetic acid concentration (HAc) as a function of the contact time for an unmodified polyurethane foam and a foam modified as described in example 5 (■ = modified polyurethane foam, ♦ = unmodified polyurethane foam)

Decrease in the acetic acid concentration (HAc) as a function of the contact time for foams of various sizes modified as described in example 6 (■ = volume of the foam pad = 37.5 cm3, ♦ = volume of the foam pad = 75 cm3, ▲ = volume of the foam pad = 150 cm3, ● = volume of the foam pad = 300 cm3)

MODIFIED POLYURETHANE FOAMED MATERIALS USED AS ADSORBENTS

The present invention relates to polyurethane foams, for example flexible, semirigid or rigid foams, preferably open-celled foams, comprising (i) ethylenimine, polyethylenimine, polyvinylamine, polyvinylamine copolymers, carboxymethylated polyethylenimines, phosphonomethylated polyethylenimines, quaternized polyethylenimines and/or dithiocarbamatized polyethyleneimines or (ii) alkali metal hydroxides or alkaline earth metal hydroxides, to their use and to a process for producing them.

The production of polyurethane foams, hereinafter also referred to as PUR foams, by reacting polyisocyanates with compounds having at least two reactive hydrogen atoms has been known for a long time and has been described many times.

Owing to the advantageous properties of PUR foams, for example in respect of their low abrasion and their resistance to chemicals, these foams are in principle very useful as support materials for active compounds. The immobilization of active compounds on polymers offers the advantages of heterogeneous reactions in both physical and chemical processes. These advantages include, for example, the ready removal and recovery of compounds, e.g. by simple filtration or regeneration, recycling and the opportunity of using the active compounds in continuous flow processes and also the high activity due to the large surface area of the support material.

Thus, WO 95/18159 describes the preparation of an ion-exchange material based on a polyurethane foam, in which the ion-exchange material is either added to the starting materials for the production of the foam or is subsequently polymerized on the foam. As ion-exchange material, mention is made of many polymers including polystyrene-polyethylenimine. The use of a polystyrene-polyethylenimine is disadvantageous for two reasons. Firstly, the polyethylenimine has to be bound to the polystyrene in an additional process step. Secondly, the effective amount of active compound introduced is reduced by the inactive polystyrene, compared to direct use of polyethylenimine.

Odorous substances are usually mixtures of organic substances which even in extraordinarily low concentrations lead to appreciable odor pollution. Many sorbents are available for separating off these odorous substances; for example, it is possible to use activated carbon, silica gels, aluminas or molecular sieves. In general, these sorbents are supported on polymeric framework substances, for example foams.

JP 03009950 describes a deodorized polyurethane foam which binds a large number of odorous substances. Components which are deodorized are, for example, compounds based on phosphoric acid, phosphorous acid, hypophosphorous acid, hydrochloric acid and their salts (alkaline earth metal and alkaline metal salts). In addition, the active compounds are preferably applied to a support (silica or alumina).

U.S. Pat. No. 4,877,816 describes a foam cloth comprising fine particles of a deodorant and a disinfectant. Deodorants mentioned are zinc carbonate and iron sulfate, while phthalimide is mentioned as disinfectant. Preference is given to using a polyurethane foam.

JP 49131986 discloses polyurethane foams which are impregnated with a solution or suspension of metallic compounds. These compounds are subsequently treated with alkaline, oxidizing or reducing compounds to produce metals, metal oxides or metal complexes on the foam. The foams can be used for odor adsorption.

JP 09057050 describes a deodorizing filter comprising a polyurethane foam which comprises an active compound, e.g. activated carbon, an ion-exchange resin, or a catalyst.

It is an object of the present invention, to develop polymers having excellent adsorption capabilities for various compounds, in particular heavy metal ions and dyes. In addition, the foams produced should also be suitable for the adsorption of anionic heavy metal complexes, anions of organic molecules (e.g. aldehydes or acids) and for the purification of wastewater from paper manufacture. A further object of the present invention is to develop a foam which reliably and quickly reduces the concentration of odorous substances, preferably without the gas comprising odorous substances flowing through it.

We have found that this object is achieved by polyurethane foams comprising compounds (i) and/or (ii).

The present invention accordingly provides polyurethane foams comprising (i) ethylenimine, polyethylenimine, polyvinylamine, polyvinylamine copolymers, carboxymethylated polyethylenimines, phosphonomethylated polyethylenimines, quaternized polyethylenimines and/or dithiocarbamatized polyethylenimines or (ii) alkali metal hydroxides and/or alkaline earth metal hydroxides or a mixture of (i) and (ii).

The invention also provides a process for producing the polyurethane foams of the present invention and provides for their use for the adsorption of odorous substances and for producing shaped bodies.

According to the present invention, ethylenimine, polyethyleninime, polyvinylimine, polyvinylamine copolymers, carboxymethylated polyethylenimines, phosphonomethylated polyethylenimines, quaternized polyethyleneimines and/or dithiocarbamatized polyethylenimines are used as compounds (i).

Possible compounds (i) are, for example: ethylenimine, polyethylenimines having a mean molecular weight of from 500 to 800,000 g/mol, carboxymethylated polyethylenimines having a mean molecular weight of from 1000 to 100,000 g/mol, phosphonomethylated polyethylenimines having a mean molecular weight of from 1000 to 100,000 g/mol, quaternized polyethylenimines having a mean molecular weight of from 1000 to 250,000 g/mol, dithiocarbamatized polyethylenimines having a mean molecular weight of from 1000 to 250,000 g/mol, polyvinylamines having a mean molecular weight of from 1000 to 150,000 g/mol, polyvinylamine copolymers having a mean molecular weight of from 1000 to 250,000 g/mol. In all these cases, the figures quoted are based on the number average molecular weight.

Preference is given to polyethylenimine and/or polyvinylamine as (i).

As alkali metal hydroxides or alkaline earth metal hydroxides (ii) to be used according to the present invention, preference is given to sodium hydroxide and potassium hydroxide.

Apart from the adsorption of heavy metal ions and odorous substances, the foams produced are also suitable for the adsorption of dyes, anionic heavy metal complexes or anions. In addition, the foams can be used for the adsorption of organic molecules (e.g. aldehydes), for the purification of wastewater from paper manufacture or for fixing acidic gases.

The polyurethane foams of the present invention are produced by reacting polyisocyanates with compounds having at least two hydrogen atoms which are reactive toward isocyanates, with the compounds (i) or (ii) being applied to the surface of the foam. The compounds (i) and (ii) can be applied to the polyurethane foam by two preferred methods.

In the first method, the polyurethane foam is produced by reacting polyisocyanates with compounds having at least two hydrogen atoms which are reactive toward isocyanates in the presence of (i) or (ii). However, prepolymers can also be prepared from the compounds (i) by reaction with isocyanate. For the present purposes, prepolymers are reaction products of compounds (i) and polyisocyanates, which preferably have free isocyanate groups at the end of the chain. The prepolymers and pseudoprepolymers and their preparation are generally known.

In the second method, the polyurethane foam is dipped into solutions of the compounds (i) or (ii). Dipping the foam into the liquid compound (i) or a solution of the solid or liquid compound (i) or (ii) in a suitable solvent results in the foam being impregnated with (i) or (ii). Suitable solvents are protic solvents, for example water, acetone, ethanol, i-propanol, methyl ethyl ketone or haloalkanes such as 1,2-dichloromethane. The solvent can subsequently be removed from the foams which have been impregnated with compound (i) or (ii). This can be achieved by applying a vacuum or by drying at up to 50° C. Thermal treatment at from 50 to 150° C. for a period of from 4 to 72 hours can enable the compounds (i) to react with the foam and thus be covalently bound thereto.

Furthermore, application of the compounds (i) or (ii) can be carried out, for example, by spraying on. In this case, the solvent also has to be removed. This can be carried out, for example, by application of a vacuum and/or heating.

In a subsequent impregnation of the foams with a solution of the compounds (i) or (ii), the uptake capacity of the foam is dependent, inter alia, on the type and polarity of the solvent in which the active compound has been dissolved. The use of acetone in particular as preferred solvent for the compounds (i) increases the capacity of the foam for (i). In the case of the compounds (ii), preference is given to using alcohol, e.g. ethanol.

The compounds (i) or (ii) applied to the foam by impregnation can, if desired, be crosslinked on the foam in a further step. Suitable crosslinkers are generally known; examples are nonvolatile PEG bisglycidyl ethers or polycarboxylic acids such as tetracarboxylic acids. The temperatures required for crosslinking are 80° C. for the ethers and from 120 to 130° C. for the polycarboxylic acids.

To achieve improved immobilization of the compound (i), the foam can be produced using an excess of isocyanate: in this case, the compound (i) can be fixed to the foam framework via remaining isocyanate groups.

The polyurethane foams of the present invention preferably have a content of (i) or (ii) or mixtures of (i) and (ii) of from 0.1 to 80% by weight, preferably from 20 to 70% by weight, particularly preferably from 25 to 60% by weight, based on the weight of the foam.

The polyurethane foams of the present invention are preferably employed in the adsorption of odorous substances and of heavy metal ions and dyes from liquids. However, the foams can also be used for the adsorption of anionic heavy metal complexes, anions, acidic compounds and organic substances such as formaldehyde. The foams can likewise be used for the purification of wastewater from paper manufacture. The foams can likewise be used for gas scrubbing, for example as ozone filter in passenger cars.

The pollutants, in particular heavy metal ions and dyes, which can advantageously be adsorbed by the polyurethane foams of the present invention are determined by the choice of the supported complexing agent. Some heavy metals (particularly mercury and lead) are also adsorbed by the polyurethane foam, which effects an additional increase in the degree of removal. Heavy metals which are adsorbed by the supported active compounds are, in particular, copper, nickel, cobalt, cadmium, mercury, lead, chromium, manganese, iron, rhenium, silver and zinc.

Liquids from which the pollutants can be adsorbed are in principle all liquids in which the latter are soluble and which do not destroy the polyurethane foam matrix. Particularly useful liquids are water, polar, water-miscible or organic solvents and any mixtures of these compounds. In the case of aqueous solutions, the proportion of organic solvents is preferably not more than 30% by weight, based on the weight of the solution, since otherwise partial demixing can occur during adsorption and lead to problems in the adsorption process.

The pollutant-containing liquid is preferably brought into contact with the novel polyurethane foam comprising (i). The polyurethane foam can be introduced as geometric shaped bodies, e.g. as cubes or spheres, or in comminuted form into the liquid, stirred in this and removed again after adsorption has occurred, for example by means of filtration. In a further embodiment of the invention, the polyurethane foam can, for example, be fixed in a tube or a cartridge and the liquid can be passed through this fixed foam. The foam can be fixed, for example, as a fixed bed in an exchange column. It has been found to be useful to employ the comminuted foam as a filter bed and to pass the solution to be purified through this filter.

Comminuted foams are particularly suitable for the process of the present invention, since the available surface area is particularly high here.

The adsorption preferably takes place at a pH in the range from 2 to 12, preferably from 4 to 10. The pH can be set by means of buffer solutions. If metal hydroxides precipitate, these can likewise be physisorbed on the foam and be separated off in this way. As buffers, it is possible to choose known buffer solutions for this pH range, e.g. a citrate buffer or a phosphate buffer.

After the exchange capacity of the polyurethane foams used according to the present invention has been exhausted, it may be possible to carry out an extraction by means of acids or complexing agents. The functionalized foam can be reused after this regeneration.

If regeneration of the foam is not possible or possible only with difficulty, it can be thermally utilized in a financially advantageous manner. The relevant metals may be present as alloy constituents in blast furnace metals.

The adsorption of radioactive compounds, atoms or ions enables radiation-emitting constituents to be collected. The increase in the volume concentration achieved in this way constitutes a great economic advantage. The resulting contaminated PUR foams can then, if appropriate, be encased in concrete or permanently sealed. Final storage is then possible.

The polyurethane foams of the present invention can also be used in the form of foam pads, particularly for the adsorption of odorous substances. Furthermore, they can be used for producing shaped articles and consumer goods. Examples include shoe soles, coathangers and padding for clothing. The production of these shaped articles also encompasses the backfoaming of articles, for example coathangers, cupboard or wardrobe doors or dashboards in vehicles.

The adsorbent foams used according to the present invention are preferably usable in a temperature range from >0°

C. to 110° C., although only a limited operation life is to be expected at temperatures of >90° C.

The polyurethane foams of the present invention are preferably open-celled so as to provide a very large surface area for contact between the compounds (i) and/or (ii) and the substances to be adsorbed.

Furthermore, it is advantageous to make the polyurethane foams hydrophilic, especially those containing the compounds (i), which makes optimum wetting of the foam with a liquid containing pollutants to be adsorbed possible. The hydrophilicity of the polyurethane foams can be increased, for example, by the use of polyetherols having a high content of ethylene oxide in the chain.

The polyurethane foams produced by the process of the present invention preferably have a density of from 10 to 800 kg/m$^3$, particularly preferably from 20 to 700 kg/m$^3$ and in particular from 40 to 60 kg/m$^3$.

To produce the polyurethanes of the present invention, the isocyanates are reacted in a customary manner with the compounds having at least two active hydrogen atoms in the presence of blowing agents and, if desired, catalysts and/or auxiliaries and/or additives. In such a production process, the compounds having at least two hydrogen atoms which are reactive toward isocyanate groups and the blowing agents, catalysts and auxiliaries and/or additives described below are frequently combined to form a polyol component prior to the reaction and this is then reacted with the isocyanate component.

As regards the possible starting materials for carrying out the process of the present invention, i.e. the isocyanates, the compounds having at least two active hydrogen atoms, the blowing agents and, if desired, the catalysts and/or the auxiliaries and/or additives, the following details may be provided:

as isocyanates, preferably polyisocyanates, particularly preferably diisocyanates, more preferably organic diisocyanates, it is possible to use the customary and known (cyclo)aliphatic and aromatic polyisocyanates. Examples of aromatic polyisocyanates are tolylene 2,4- and 2,6-diisocyanate (TDI), diphenylmethane 4,4'-, 2,4'- and 2,2'-diisocyanate (MDI), polyphenylene-polymethylene polyisocyanate (crude MDI), naphthylene 1,5-diisocyanate.

Examples of (cyclo)aliphatic diisocyanates or triisocyanates are tetramethylene 1,4-diisocyanate, hexamethylene 1,6-diisocyanate, isophorone diisocyanate, 2-methylpentamethylene diisocyanate, 2,2,4- or 2,4,4-trimethylhexamethylene 1,6-diisocyanate, 2-butyl-2-ethylpentamethylene diisocyanate, 1,4-diisocyanatocyclohexane, 3-isocyanatomethyl-1-methyl-1-isocyanatocyclohexane, isocyanatopropylcyclohexyl isocyanate, xylylene diisocyanate, tetramethylxylylene diisocyanate, bis(4-isocyanatocyclohexyl)methane, lysine ester isocyanate, 1,3- or 1,4-bis(isocyanatomethyl) cyclohexane, 4-isocyanatomethyloctamethylene 1,8-diisocyanate and also their mixtures or the oligoisocyanates or polyisocyanates prepared therefrom.

The oligoisocyanates or polyisocyanates can be prepared from the abovementioned diisocyanates or triisocyanates or their mixtures by linkage via urethane, allophanate, urea, biuret, uretdione, amide, isocyanurate, carbodiimide, uretonimine, oxadiazinetrione or iminooxadiazinedione structures.

The abovementioned isocyanates can also be modified, for example by incorporation of carbodiimide groups. The polyisocyanates are also frequently used in the form of prepolymers. These are reaction products of the abovementioned polyisocyanates with polyol components. Use is usually made of isocyanate prepolymers, i.e. reaction products of polyols and polyisocyanates which have free isocyanate groups at the end of the chain. The prepolymers and pseudoprepolymers and their preparation are generally known and have been described many times. In the process of the present invention, particular preference is given to using prepolymers having an NCO content in the range from 25 to 3.5% by weight.

In a preferred embodiment of the process of the present invention, MDI and/or crude MDI and biurets, isocyanurates and allophanates based on aliphatic isocyanates are used as isocyanate components.

As compounds having at least two active hydrogen atoms, preference is given to using polyester alcohols and particular preference is given to using polyetherols having a functionality of from 2 to 8, in particular from 2 to 4, preferably from 2 to 3, and a mean molecular weight in the range from 1000 to 8500 g/mol, preferably from 1000 to 6000. Compounds having at least two active hydrogen atoms also include the chain extenders and crosslinkers which may also be used. Preferred chain extenders and crosslinkers are 2- and 3-functional alcohols having molecular weights of less than 1000 g/mol, in particular in the range from 60 to 150. Examples are ethylene glycol, propylene glycol, diethylene glycol, dipropylene glycol, polyethylene glycol having a molecular weight of less than 1000, polypropylene glycol having a molecular weight of less than 1000 and/or 1,4-butanediol. Diamines can also be used as crosslinkers. If chain extenders and crosslinkers are used, their amount is preferably up to 5% by weight, based on the weight of the isocyanates.

As catalysts for the production of the polyurethane foams of the present invention, it is possible to use the customary and known polyurethane formation catalysts, for example organic tin compounds such as tin diacetate, tin dioctoate, dialkyltin dilaurate and/or strongly basic amines such as triethylamine, pentamethyldiethylenetriamine, bis (dimethylaminoethyl) ether, 1,2-dimethylimidazole, dimethylcyclohexylamine, dimethylbenzylamine or preferably triethylenediamine. The catalysts are preferably used in an amount of from 0.01 to 5% by weight, preferably from 0.05 to 2% by weight, based on the weight of the isocyanates.

As blowing agent for producing the polyurethane foams, preference is given to using water which reacts with the isocyanate groups to liberate carbon dioxide. It is also possible to use physically acting blowing agents, for example hydrocarbons such as n-pentane, isopentane or cyclopentane or halogenated hydrocarbons such as tetrafluoroethane, pentafluoropropane, heptafluoropropane, pentafluorobutane, hexafluorobutane or dichloromonofluoroethane or acetals such as methylal in combination with or in place of water. The amount of the physically acting blowing agent is preferably in the range from 1 to 15% by weight, in particular from 1 to 10% by weight, and the amount of water is preferably in the range from 0.5 to 10% by weight, in particular from 1 to 5% by weight, based on the weight of the compounds having at least two active hydrogen atoms.

As auxiliaries and/or additives, it is possible to use, for example, surface-active substances, foam stabilizers, cell regulators, external and internal mold release agents, fillers, pigments, hydrolysis inhibitors and also fungistatic and bacteriostatic substances.

In the production of the polyurethane foams of the present invention, the polyisocyanates and the compounds having at least two hydrogen atoms which are reactive toward isocyanate groups are preferably reacted in such an amount that the equivalence ratio of isocyanate groups to the sum of active hydrogen atoms is 0.7–1.8:1, preferably 0.7–1.2:1.

The polyurethane foams are preferably produced by the one-shot process, for example with the aid of the high-pressure or low-pressure technique. The foams can be produced in open or closed metallic molds or by continuous application of the reaction mixture to belts for producing slabstock foams.

It is particularly advantageous to employ the two-component process in which, as indicated above, a polyol component and an isocyanate component are prepared and then foamed together. The components are preferably mixed at from 15 to 90° C., preferably from 20 to 60° C. and particularly preferably from 20 to 35° C., and introduced into the mold or applied to the belt. The temperature in the mold is usually in the range from 20 to 110° C., preferably from 30 to 60° C. and particularly preferably from 35 to 55° C.

In the case of the direct addition of the compounds (i) or (ii) in the production of the polyurethane foams, they can be added either to the polyol component or the isocyanate component. Preference is given to adding (i) or (ii) to the polyol component.

Figure 1:
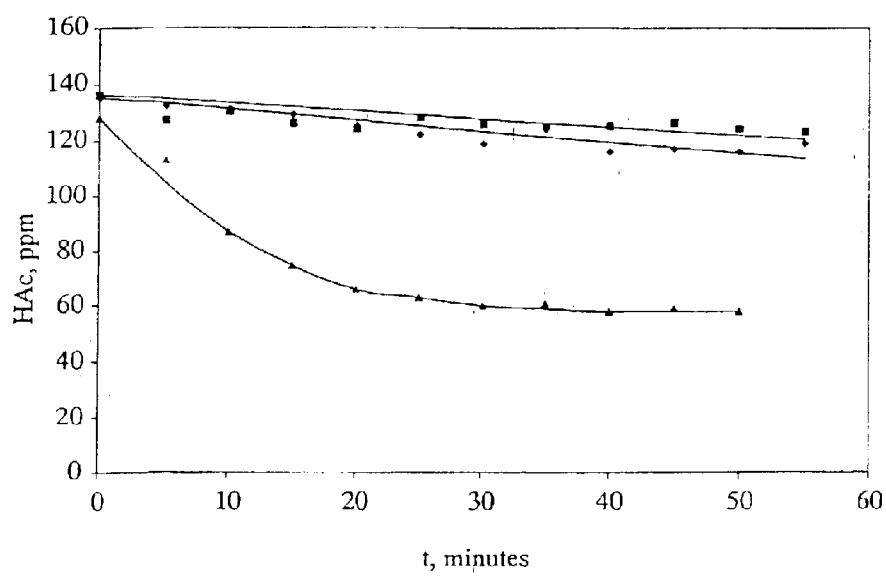
FIGS 1–6 are graphical representations of gas chromatography showing decreases in acetic acid concentrations versus time.

The invention is illustrated by the following examples.

EXAMPLES

Example 1
Production of a Polyurethane Foam

The polyurethane foam was produced using the foam formulation indicated in Table 1. Isocyanate component and polyol component were foamed at an index of 100.

TABLE 1

| Formulation of the polyurethane foam produced in Example 1 | |
| --- | --- |
| Constituent | % by weight |
| Lupranol 2040 | 5.0 |
| Lupranol 2047 | 87.0 |
| Lupranol 3402 | 8.0 |
| Lupragen N 201 | 0.15 |
| Lupragen N 206 | 0.1 |
| Tegostab B 8418 | 3.2 |
| Water | 3.2 |
| B 620/1 | 75.0 |
| Lupranat M20W | 25.0 |

Lupranol ® 2040, (BASF Aktiengesellschaft), polyetherol based on glycerol, OHZ = 28.0
Lupranol ® 2047, (BASF Aktiengesellschaft), polyetherol based on glycerol, OHZ = 42.0
Lupranol ® 3402, (BASF Aktiengesellschaft), polyetherol based on ethylenediamine, OHZ = 470
Lupragen ® N 201, (BASF Aktiengesellschaft), (33% strength solution of DABCO in dipropylene glycol)
Lupragen ® N 206, (BASF Aktiengesellschaft), bis(dimethylaminoethyl) ether, 70% in dipropylene glycol
Tegostab B 8418 (Goldschmidt), silicone stabilizer
B 620/1 ®, Elastogran, prepolymer derived from Lupranat MI, Lupranat M20W and Lupranol 2030
Lupranat ® M20W, (BASF Aktiengesellschaft), oligomeric MDI After they had been produced, the foams were processed in a mill to give foam particles.

Example 2
Immobilization of Polyethylenimine

The foam particles produced in Example 1 were shaken with 5% strength aqueous Lupasol solutions for 15 minutes, using 25 ml of the Lupasol solutions per gram of foam. The foam particles were subsequently filtered off, heated at 100° C. for 16 hours and then washed with distilled water.
  a) Lupasol® FG (BASF Aktiengesellschaft, polyethylenimine having an MG of 800 g/mol)
  b) Lupasol® PR (BASF Aktiengesellschaft, polyethylenimine having an MG of 2000 g/mol)
  c) Lupasol® WF (BASF Aktiengesellschaft, polyethylenimine having an MG of 25000 g/mol)

Example 3
Immobilization of Polyethylenimine

The foam particles produced in Example 1 were shaken with a 20% strength aqueous Lupasol® WF solution for 15 minutes, using 25 ml of the solution per gram of foam. The foam particles were subsequently filtered off, heated at 100° C. for 16 hours and then washed with distilled water.

Example 4
Immobilization of Polyethylenimine

The foam particles produced in Example 1 were shaken with a 20% strength Lupasol® WF solution in acetone for 15 minutes, using 25 ml of the solution per gram of foam. The foam particles were subsequently filtered off, heated at 100° C. for 16 hours and then washed with distilled water.

Example 5
Immobilization of Polyethylenimine

The foam particles produced in Example 1 were shaken with a 20% strength aqueous Lupasol® P solution for 15 minutes, using 25 ml of the solution per gram of foam. The foam particles were subsequently filtered off, heated at 100° C. for 16 hours and then washed with distilled water.

Lupasol® P (BASF Aktiengesellschaft, polyethylenimine having an MG of 750000 g/mol)

Example 6
Immobilization of Polyethylenimine

The foam particles produced in Example 1 were shaken with a 10% strength Lupasol® WF solution in acetone for 15 minutes, using ml of the solution per gram of foam. The foam particles were subsequently filtered off, heated at 100° C. for 16 hours and then washed with distilled water.

Example 7
Immobilization of Polyethylenimine

The foam particles produced in Example 1 were shaken with a 27% strength Lupasol® WF solution in acetone for 15 minutes, using 25 ml of the solution per gram of foam. The foam particles were subsequently filtered off, heated at 100° C. for 16 hours and then washed with distilled water.

Example 8
Immobilization of Polyvinylamine

The foam particles produced in Example 1 were shaken with an aqueous polyvinylamine solution (k=88.9) for 15 minutes, using 25 ml of the polyvinylamine solution per gram of foam. The foam particles were subsequently filtered off, heated at 100° C. for 16 hours and then washed with distilled water
  a) Concentration of the polyvinylamine solution: 6.5%
  b) Concentration of the polyvinylamine solution: 13%

Example 9
Immobilization of Polyvinylamine

The foam particles produced in Example 1 were shaken with an aqueous polyvinylamine solution (k=162) for 15 minutes, using 25 ml of the polyvinylamine solution per gram of foam. The foam particles were subsequently filtered off, heated at 100° C. for 16 hours and then washed with distilled water a) Concentration of the polyvinylamine solution: 2.1%
b) Concentration of the polyvinylamine solution: 4.2%

Example 10
Use of the Foams for Reducing the Concentration of Heavy Metals The suitability of the foams produced in Example 2 for reducing the concentration of heavy metals was qualified by way of example for the case of the copper binding capacity. For this purpose, 2 g of each foam were shaken with 100 ml of copper solution for 2 hours. The copper concentrations of the starting solution and of the solutions after contact with the foam particles were determined photometrically using a cuvette tester from the company Dr. Lange. The following copper removals were obtained.

Foam from Example 2a) 43.7 mg of Cu
Foam from Example 2b) 47.0 mg of Cu
Foam from Example 2c) 60.8 mg of Cu

Example 11
Use of the Foams for Decreasing the Concentration of Heavy Metals The suitability of the foams produced in Examples 3 and 4 for reducing the concentration of heavy metals was qualified by way of example for the case of the copper binding capacity. For this purpose, 1 g of each foam was shaken with 100 ml of copper solution for 2 hours. The copper concentrations of the starting solution and of the solutions after contact with the foam particles were determined photometrically using a cuvette tester from the company Dr. Lange. The results are summarized in Table 2.

TABLE 2

Comparison of the copper removals achieved by the foams produced in Examples 3 and 4

| Available copper: | Foam from Example 3 bound copper: | Foam from Example 4 bound copper: |
|---|---|---|
| 49 mg/g of foam | 45.5 mg/g of foam | 43.8 mg/g of foam |
| 101 mg/g of foam | 73.7 mg/g of foam | 70.1 mg/g of foam |
| 201 mg/g of foam | 84.3 mg/g of foam | 146.2 mg/g of foam |
| 299 mg/g of foam | 94.6 mg/g of foam | 178.4 mg/g of foam |

Example 12
Use of the Foams for Reducing the Concentration of Heavy Metals The suitability of the foams produced in Examples 3 and 5 for reducing the concentration of heavy metals was qualified by way of example for the case of the copper binding capacity. For this purpose, 1 g of each foam was shaken with 100 ml of copper solution for 2 hours. The copper concentrations of the starting solution and of the solutions after contact with the foam particles were determined photometrically using a cuvette tester from the company Dr. Lange. The results are summarized in Table 3.

TABLE 3

Comparison of the copper removals achieved by the foams produced in Examples 3 and 5

| Available copper: | Foam from Example 3 Bound copper: | From from Example 5 Bound copper: |
|---|---|---|
| 49 mg/g of foam | 45.5 mg/g of foam | 44.0 mg/g of foam |
| 101 mg/g of foam | 73.7 mg/g of foam | 82.0 mg/g of foam |
| 201 mg/g of foam | 84.3 mg/g of foam | 129.4 mg/g of foam |
| 299 mg/g of foam | 94.6 mg/g of foam | 132.8 mg/g of foam |
| 399 mg/g of foam | 94.6 mg/g of foam | 136.4 mg/g of foam |

Example 13
Use of the Foams for Reducing the Concentration of Heavy Metals The suitability of the foams produced in Examples 4, 6 and 7 for reducing the concentration of heavy metals was qualified by way of example for the case of the copper binding capacity. For this purpose, 1 g of each foam was shaken with 100 ml of copper solution for 2 hours. The copper concentrations of the starting solution and of the solutions after contact with the foam particles were determined photometrically using a cuvette tester from the company Dr. Lange. The results are summarized in Table 4.

TABLE 4

Comparison of the copper removals achieved by the foams produced in Examples 3 and 5

| Concentration of the solution Available copper: | Foam from Example 6 bound copper: | Foam from Example 4 bound copper: | Foam from Example 7 bound copper: |
|---|---|---|---|
| 49 mg/g of foam | 33.5 mg/g of foam | 43.8 mg/g of foam | 44.0 mg/g of foam |
| 101 mg/g of foam | 55.6 mg/g of foam | 70.1 mg/g of foam | 71.5 mg/g of foam |
| 201 mg/g of foam | 76.4 mg/g of foam | 146.2 mg/g of foam | 142.3 mg/g of foam |
| 299 mg/g of foam | | 178.4 mg/g of foam | 211.4 mg/g of foam |
| 399 mg/g of foam | | | 239.0 mg/g of foam |
| 499 mg/g of foam | | | 258.0 mg/g of foam |

Example 14
Use of the Foams for Reducing the Concentration of Heavy Metals To determine the kinetics of heavy metal removal, which was qualified by way of example for the case of copper removal, 0.1 g of the foam produced in Example 4 was shaken with 100 ml of a 250 ppm copper solution for various times. The copper concentrations of the starting solution and of the solutions after contact with the foam particles were determined photometrically using a cuvette tester from the company Dr. Lange. The results are summarized in Table 5.

TABLE 5

Kinetics of copper removal by means of the foam produced in Example 4

| Contact time | Copper concentration of the solution |
|---|---|
| Starting concentration | 245 ppm |
| t = 5 min. | 203 ppm |
| t = 15 min. | 195 ppm |
| t = 30 min. | 184 ppm |
| t = 60 min. | 172 ppm |
| t = 240 min. | 138 ppm |
| t = 1440 min. | 137 ppm |

Example 15
Use of the Foams for Reducing the Concentration of Heavy Metals

Foam particles produced in Example 7 were used for reducing the concentration of various heavy metals. For this purpose, 1 g of the foam particles were in each case shaken with 100 ml of a solution containing 3000 ppm of heavy metal for 2 hours. The heavy metal concentrations of the starting solution and of the solutions after contact with the foam particles were determined by means of atomic absorption spectrometry. The results are summarized in Table 6.

TABLE 6

Removal of various heavy metals by means of the foam produced in Example 7

| heavy metal | Starting concentration | remaining in the solution | removed mg/g of foam |
|---|---|---|---|
| Nickel(II) | 3300 mg/l | 2500 mg/l | 80.0 mg/g of foam |
| Iron(III) | 2800 mg/l | 2500 mg/l | 30.0 mg/g of foam |
| Lead(II) | 2900 mg/l | 185 mg/l | 271.5 mg/g of foam |
| Copper(II) | 2990 mg/l | 876 mg/l | 211.4 mg/g of foam |
| Zinc(II) | 2800 mg/l | 1600 mg/l | 120.0 mg/g of foam |
| Mercury (II) | 3000 mg/l | 34 mg/l | 296.6 mg/g of foam |

Example 16
Regeneration of the Foams 15 g of the foam particles produced as described in Example 5 were shaken with 375 ml of a 2000 ppm copper chloride solution for 30 minutes. The supernatant copper solution was subsequently filtered off, and the foam particles were regenerated using 0.5 N hydrochloric acid. The foam particles were loaded again by shaking them once more with 375 ml of a 2000 ppm copper chloride solution (30 minutes). The results are summarized in Table 7.

TABLE 7

Removal of copper ions

| Pass | Copper ions removed mg/g of foam |
|---|---|
| 1 | 32.3 |
| 2 | 22.8 |
| 3 | 23.4 |
| 4 | 22.7 |
| 5 | 22.9 |
| 6 | 22.2 |
| 7 | 22.4 |
| 8 | 23.2 |

TABLE 7-continued

Removal of copper ions

| Pass | Copper ions removed mg/g of foam |
|---|---|
| 9 | 23.6 |
| 10 | 24.7 |
| 11 | 22.8 |
| 12 | 23.2 |
| 13 | 23.4 |
| 14 | 23.7 |
| 15 | 24.3 |
| 16 | 23.7 |
| 17 | 22.5 |
| 18 | 22.8 |
| 19 | 23.4 |

Example 17

Use of the Foams for Purification of Wastewater from Paper Manufacture

Foam particles produced as described in Examples 7 and 9b were used for purifying an original wastewater from a paper factory. For this purpose, varying amounts of the foam were shaken with 50 ml of the wastewater for 30 minutes. The quality of the purification was determined photometrically via the reduction in the absorbance at a wavelength of 297 nm. The results are summarized in Table 8.

TABLE 8

Reduction in the absorbance of a wastewater from paper manufacture

| Foam, g/50 ml | Absorbance (l = 297 nm), % of foam from Example 7 | Absorbance (l = 297 nm), % of foam from Example 9b |
|---|---|---|
| Starting solution | 100 | 100 |
| 0.05 g | 85.4 | 95.3 |
| 0.1 g | 55.5 | 92.0 |
| 0.2 g | 26.3 | 79.9 |
| 0.3 g | 23.9 | 63.3 |
| 0.5 g | 27.2 | 15.0 |

Example 18

Use of the Foams for Reducing the Concentration of Dyes

The wastewater of a dyeing works comprises mainly hydrolyzed dyes, and for this reason the reactive dye Remazol® Rot 198 (Dystar) was dissolved beforehand in 0.01N sodium hydroxide solution and subsequently hydrolyzed on a waterbath at 60–70° C. for about 3 hours.

To decrease the concentration of the dye, 1 g of foam particles from Example 7 were subsequently shaken with 50 ml of dye solution for 5 hours, and the dye concentration in the solution was determined photometrically at the absorption maximum. Calibration was carried out using hydrolyzed dyes with identical sample treatment. The results of the removal of Remazol Rot 198 at various pH values are summarized in Table 9.

TABLE 9

Reduction in the concentration of the reactive dye Remazol Rot 198

| Available dye mg/g of foam | Dye removed mg/g of foam | | |
|---|---|---|---|
| | pH = 10 | pH = 7 | pH = 5 |
| 25 | 22 | 22 | 23 |
| 50 | 47 | 47 | 48 |
| 125 | 115 | 115 | 119 |
| 200 | 170 | 171 | 185 |

Example 19
Use of the Foams for Reducing the Concentration of Dyes

The wastewater of a dyeing works comprises mainly hydrolyzed dyes, and for this reason the reactive dye Procion Blue MX-R (Fluka, CAS: 13324-20-4) was dissolved beforehand in 0.01N sodium hydroxide solution and subsequently hydrolyzed on a waterbath at 60–70° C. for about 3 hours.

To decrease the concentration of the dye, 1 g of foam particles from Example 7 was subsequently shaken with 50 ml of dye solution for 6 hours, and the dye concentration in the solution was determined photometrically at the absorption maximum. Calibration was carried out using hydrolyzed dyes with identical sample treatment. The results are summarized in Table 10.

TABLE 10

Reduction in the concentration of the reactive dye Procion Blue MX-R

| Available dye mg/g of foam | Dye removed mg/g of foam |
|---|---|
| 25 | 25 |
| 50 | 50 |
| 120 | 99 |
| 200 | 198 |

Example 20
Use of the Foams for Reducing the Concentration of Heavy Metals

The suitability of the foams produced in Examples 8 and 9 for reducing the concentration of heavy metals was qualified by way of example for the case of the copper binding capacity. For this purpose, 1 g of each foam was shaken with 100 ml of copper solution for 2 hours. The copper concentrations of the starting solution and of the solutions after contact with the foam particles were determined photometrically using a cuvette tester from the company Dr. Lange. The results are summarized in Table 11.

TABLE 11

Comparison of the copper removals achieved by the foams produced in Examples 8 and 9

| Available copper | bound copper Example 8a | Example 8b | Example 9a | Example 9b |
|---|---|---|---|---|
| 50 mg/g of foam | 27.9 mg/g of foam | 28.5 mg/g of foam | | |
| 99 mg/g of foam | 35.2 mg/g of foam | 62.1 mg/g of foam | 27.5 mg/g of foam | 59.6 mg/g of foam |
| 199 mg/g of foam | 46.1 mg/g of foam | 102.3 mg/g of foam | 36.0 mg/g of foam | 74.3 mg/g of foam |
| 299 mg/g of foam | 48.7 mg/g of foam | 113.4 mg/g of foam | 47.0 mg/g of foam | 85.4 mg/g of foam |
| 401 mg/g of foam | | 138.0 mg/g of foam | 52.0 mg/g of foam | 100.1 mg/g of foam |
| 499 mg/g of foam | | 144.1 mg/g of foam | 53.0 mg/g of foam | 101.0 mg/g of foam |

Examples 21 to 31 relate to the use of the foams of the present invention for the adsorption of odorous substances.

To assess the adsorption of odorous substances according to the present invention, various modified or unmodified polyurethane foams were produced and tested. The odorous substances were simulated by acidic odorous substances such as acetic acid. The adsorption of the model compounds was carried out at 25° C. in a controlled-temperature cabinet having a capacity of 560 l. Concentrations of about 140–160 ppm v/v (v/v=volume-based concentrations) of model substance were set within the temperature-controlled cabinet. After the foam had been added, the decrease in concentration was determined by means of gas chromatography. The Lupranols are various polyetherols which had been prepared using various starters and differ in the amount of ethylene oxide/propylene oxide; the Lupranats are various products based on MDI.

Example 21

An aromatic flexible polyurethane foam, hereinafter referred to as comparative system 1, was produced by intensive mixing of 105.2 g of the A component with 100 g of the B component (Index 100) with the aid of a stirrer at a rotational speed of 1250 rpm and transfer of the foaming mixture to a plastic container having a capacity of 5 l, with the components being made up as follows:

Polyol component:

| | |
|---|---|
| 97.0 parts of | Lupranol 2040 ® (BASF Aktiengesellschaft) |
| 3.0 parts of | Lupranol 2047 ® (BASF Aktiengesellschaft) |
| 3.3 parts of | water |
| 0.6 part of | Lupragen N 107 ® (BASF Aktiengesellschaft) |
| 0.8 part of | aminopropylimidazol |
| 0.5 part of | Tegostab B 8631 ® (Goldschmidt) |

-continued

| | B Component: |
|---|---|
| 42 parts of | Lupranat M 20 W ® |
| 11 parts of | Lupranat MES ® |
| 47 parts of | Lupranat MI ® |

Example 22

An aromatic flexible polyurethane foam, hereinafter referred to as comparative system 2, was produced by intensive mixing of 115.24 g of the A component with 100 g of the B component (Index 100) with the aid of a stirrer at a rotational speed of 1250 rpm and transfer of the foaming mixture to a plastic container having a capacity of 5 l, with the components being made up as follows:

| | Polyol component: |
|---|---|
| 95 parts of | Lupranol 2045 ® (BASF Aktiengesellschaft) |
| 5 parts of | Lupranol 2047 ® (BASF Aktiengesellschaft) |
| 10.71 parts of | Lupranol 2030 ® (BASF Aktiengesellschaft) |
| 3.45 parts of | water |
| 0.48 part of | Lupragen N 201 ® (BASF Aktiengesellschaft) |
| 0.13 part of | Lupragen N 206 ® (BASF Aktiengesellschaft) |
| 0.37 part of | tetramethylhexamethylenediamine (BASF Aktiengesellschaft) |
| 0.1 part of | Tegostab B 8680 ® (Goldschmidt) |
| | B Component: |
| 75 parts of | Lupranat M 20 W ® |
| 25 parts of | Lupranat MP 111 ® |

Example 23

An aliphatic flexible polyurethane foam, hereinafter referred to as comparative system 3, was produced by intensive mixing of 110 g of the A component with 100 g of the B component (Index 110) with the aid of a stirrer at a rotational speed of 1250 rpm and transfer of the foaming mixture to a plastic container having a capacity of 5 l, with the components being made up as follows:

| | Polyol component: |
|---|---|
| 56 parts of | Lupranol 2042 ® (BASF Aktiengesellschaft) |
| 35 parts of | Lupranol 2045 ® (BASF Aktiengesellschaft) |
| 2 parts of | water |
| 3 parts of | Lupragen N 209 ® (BASF Aktiengesellschaft) |
| 2 parts of | Lupragen N 201 ® (BASF Aktiengesellschaft) |
| 1 part of | Lupragen N 206 ® (BASF Aktiengesellschaft) |
| 1 part of | Kosmos 29 ® (Goldschmidt) |
| 1 part of | Tegostab B 8680 ® (BASF Aktiengesellschaft) |
| | B Component: |
| 100 parts of | Basonat HI 100 ® (BASF Aktiengesellschaft) |

Example 24

To modify the polyurethane foams of Examples 1 to 3, the foams were impregnated with an ethanolic KOH solution (KOH content=5%) and subsequently heated at 100° C.

Example 25

To modify the polyurethane foams of Examples 1 to 3, the foams were impregnated with a 5% strength solution of polyethylenimine in acetone and subsequently heated at 100° C.

Example 26

A plate having dimensions of 20×30×1 cm$^3$ was cut from the foam produced in Example 2). This was subsequently introduced into a temperature-controlled cabinet having a capacity of 560 l in which an acetic acid concentration of about 140–160 ppm v/v (v/v=volume-based concentration) had previously been set. The decrease in the acetic acid concentration was measured every five minutes by means of a gas chromatograph and is shown graphically in FIG. 1. The acetic acid concentrations obtained using Basotect® (melamine-formaldehyde foam from BASF Aktiengesellschaft) and an open-celled polystyrene foam are shown as a function of time for comparison.

Example 27

Figure 2:
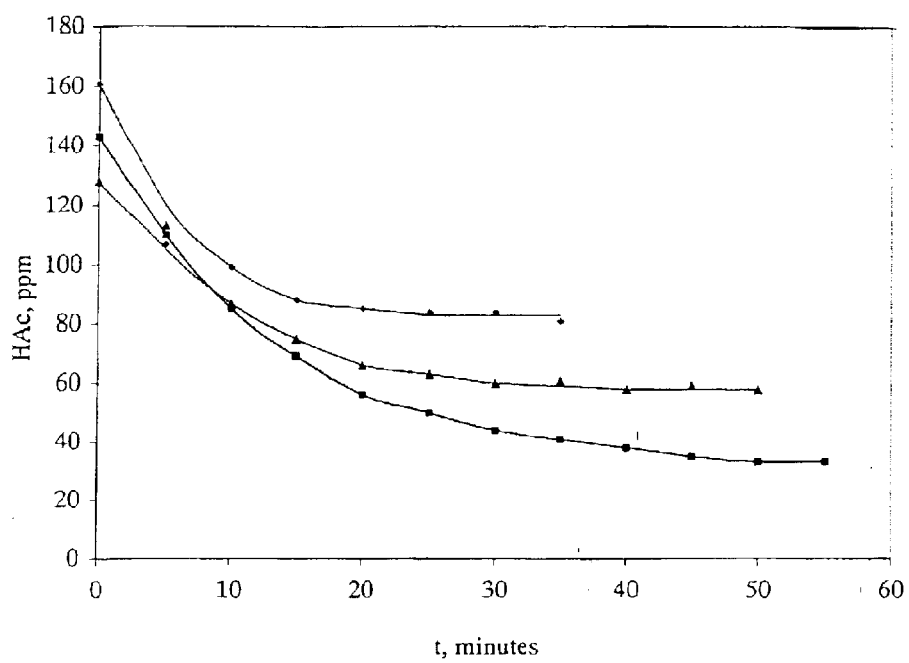

Plates having dimensions of 20×30×1 cm$^3$ were in each case cut from the foams produced in Examples 1), 2) and 3). These were subsequently introduced into a temperature-controlled cabinet having a capacity of 560 l in which an acetic acid concentration of about 140–160 ppm v/v (v/v=volume-based concentration) had previously been set. The decrease in the acetic acid concentration was measured every five minutes using a gas chromatograph and is shown graphically in FIG. 2.

Example 28

Figure 3:
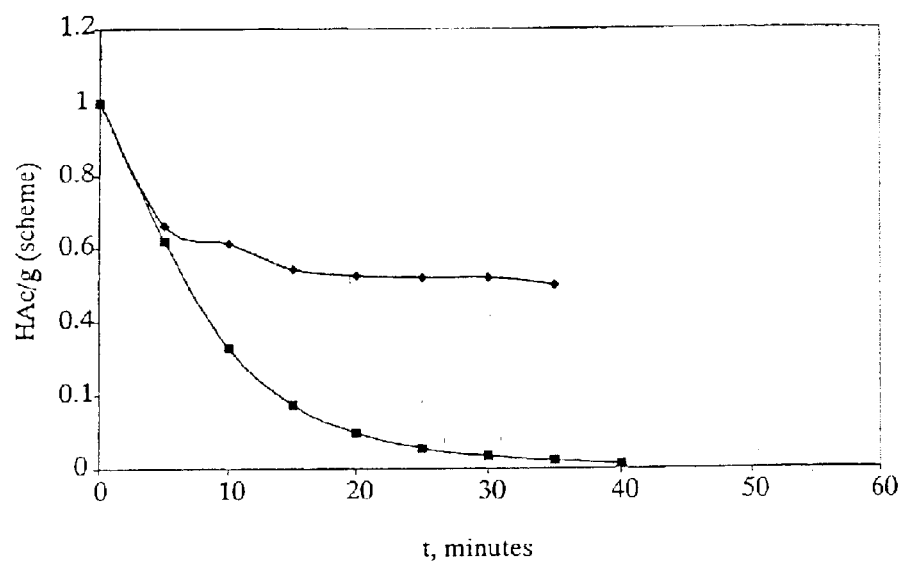

Two plates having dimensions of 20×30×1 cm$^3$ were cut from the aromatic polyurethane foam produced in Example 1). One of these plates was additionally treated as described in Example 4). The results in FIG. 3 show, for comparison, the decrease in the acetic acid concentration as monitored by gas chromatography for the modified foam and the unmodified foam. The acetic acid concentration was arbitrarily set as 100% at time t=0

Example 29

Figure 4:
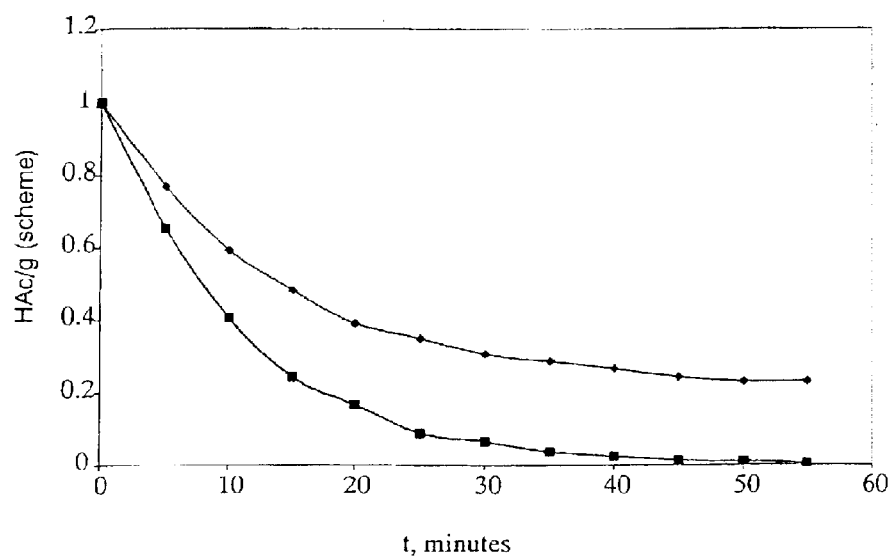

Two plates having dimensions of 20×30×1 cm$^3$ were cut from the aliphatic polyurethane foam produced in Example 3). One of these plates was additionally treated as described in Example 4). The results in FIG. 4 show, for comparison, the decrease in the acetic acid concentration as monitored by gas chromatography for the modified foam and the unmodified foam.

Example 30

Figure 5:
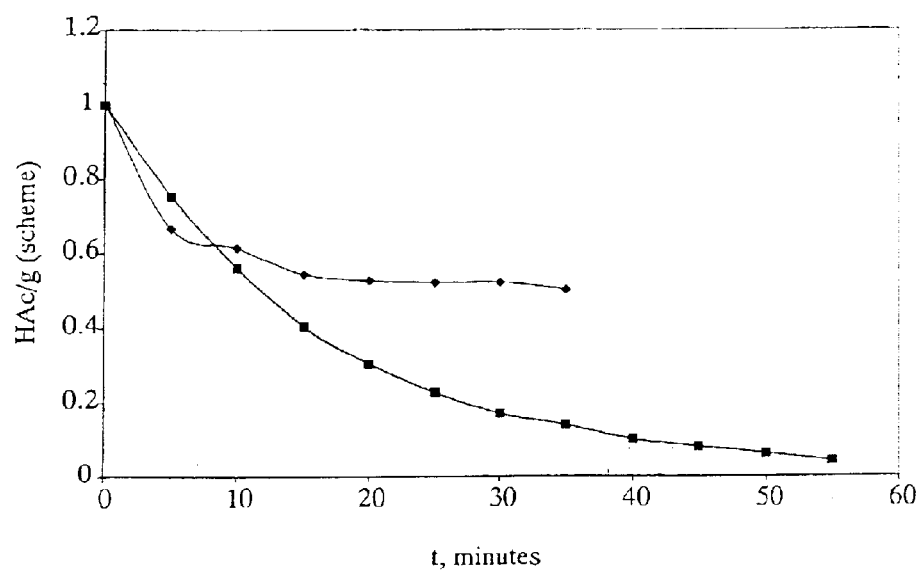

Two plates having dimensions of 20×30×1 cm$^3$ were cut from the aromatic polyurethane foam produced in Example 1). One of these plates was additionally treated as described in Example 5). The results in FIG. 5 show, for comparison, the decrease in the acetic acid concentration as monitored by gas chromatography for the modified foam and the unmodified foam.

Example 31

Figure 6:
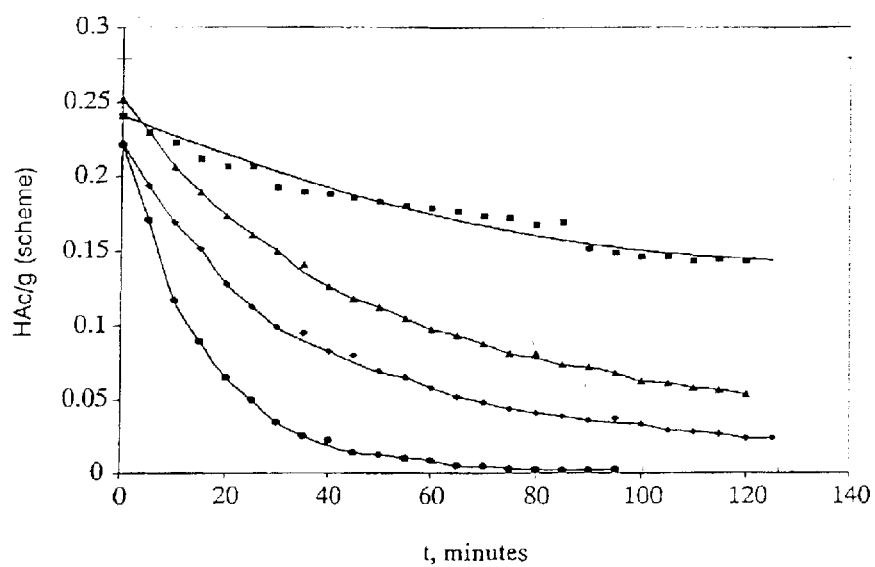

Plates of various dimensions were cut from the aromatic polyurethane foam produced in Example 1), and the plates were treated as described in Example 5). The results in FIG. 6 show, for comparison, the decrease in the acetic acid concentration monitored by gas chromatography for the modified foam pads of differing dimensions.

We claim:

1. A process, comprising:
preparing a polyurethane foam by:
reacting one or more polyisocyanates with one or more compounds having at least two hydrogen atoms which are reactive toward isocyanates, thereby preparing a polyurethane foam and then applying:
 (i) ethylenimine, polyethylenimine, polyvinylamine, polyvinylamine copolymers, carboxymethylated polyethylenimines, phosphonomethylated polyethyleneimines, quaternized polyethylenimines, dithiocarbamatized polyethylenimines or a mixture thereof,
 (ii) alkali metal hydroxides, alkaline earth metal hydroxides, or a mixture thereof, or
 (iii) a mixture of (i) and (ii), to the surface of a polyurethane foam.

2. The process as claimed in claim 1, wherein the reaction is conducted in the presence of component (i), (ii), or (iii) a mixture thereof.

3. The process as claimed in claim 1, further comprising:
 impregnating the polyurethane foam with the component (i) or solutions of the component (ii) after the reaction.

4. The process as claimed in claim 1, wherein said polyisocyanate is tolylene 2,4- or 2,6-diisocyanate, diphenylmethane 4,4'-, 2,4'- or 2,2'-diisocyanate, polyphenylene-polymethylene polyisocyanate, naphthalene-1,5-diisocyanate, tetramethylene-1,4-diisocyanate, hexamethylene-1,6-diisocyanate, isophorone diisocyanate, 2-methylpentamethylene diisocyanate, 2,2,4- or 2,4,4-trimethylhexamethylene-1,6-diisocyanate, 2-butyl-2-ethylpentamethylene diisocyanate, 1,4-diisocyanatocyclohexane, 3-isocyanatomethyl-1-methyl-1-isocyanatocyclohexane, isocyanatopropylcyclohexyl isocyanate, xylylene diisocyanate, tetramethylxylylene diisocyanate, bis (4-isocyanatocyclohexyl)methane, lysine ester isocyanates, 1,3- or 1,4-bis (isocyanatomethyl) cyclohexane, or 4-isocyanatomethyloctamethylene-1,8-diisocyanate.

5. The process as claimed in claim 1, wherein said compound having at least two hydrogen atoms is a polyetherol having a functionality of 2 to 8 and a molecular weight of 1000 to 8500 g/mol.

6. The process as claimed in claim 1, wherein the equivalence ratio of isocyanate groups to the sum of the active hydrogen atoms ranges from 0.7 to 1.8:1.

7. The process as claimed in claim 6, wherein the equivalence ratio of isocyanate groups to the sum of the active hydrogen atoms ranges from 0.7 to 1.2:1.

* * * * *